US012709186B2

(12) United States Patent
Ichikawa

(10) Patent No.: US 12,709,186 B2
(45) Date of Patent: Aug. 18, 2026

(54) ELECTRIFIED VEHICLE

(71) Applicant: TOYOTA JIDOSHA KABUSHIKI KAISHA, Toyota (JP)

(72) Inventor: Shinji Ichikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/937,511

(22) Filed: Nov. 5, 2024

(65) Prior Publication Data

US 2025/0178480 A1 Jun. 5, 2025

(30) Foreign Application Priority Data

Dec. 5, 2023 (JP) ................................ 2023-205462

(51) Int. Cl.

*B60L 58/10* (2019.01)
*B60L 3/00* (2019.01)
*B60L 50/60* (2019.01)
*B60L 53/80* (2019.01)
*B60L 58/18* (2019.01)

(52) U.S. Cl.

CPC ............. *B60L 58/18* (2019.02); *B60L 3/0046* (2013.01); *B60L 50/60* (2019.02); *B60L 53/80* (2019.02); *B60L 2250/12* (2013.01); *B60L 2250/16* (2013.01)

(58) Field of Classification Search

USPC ........................................................... 701/22
See application file for complete search history.

(56) References Cited

U.S. PATENT DOCUMENTS 2,016 A * 3/1841 Sawyer ..................... F24B 1/18 297/80
11,900,332 B2 * 2/2024 Yamasaki .............. G06Q 10/20
12,122,261 B2 * 10/2024 Liu ........................... B60L 3/00
12,304,343 B2 * 5/2025 Murata .................. G06Q 10/02
2009/0198372 A1 * 8/2009 Hammerslag ............. G07F 7/06 700/226
2015/0127479 A1 * 5/2015 Penilla .................... B60L 53/31 705/305
2018/0026244 A1 * 1/2018 Ito ........................... B60L 50/64 429/96
2018/0152027 A1 * 5/2018 Peng ....................... B60L 53/00
2018/0178664 A1 * 6/2018 Huang .................... B60L 53/80
2018/0251102 A1 * 9/2018 Han .................... H01M 50/578
2019/0054978 A1 * 2/2019 Toya ....................... B60L 50/20
2019/0126775 A1 * 5/2019 Han .......................... B60L 3/12
2020/0016984 A1 * 1/2020 Mantea .................. B60L 53/60

(Continued)

FOREIGN PATENT DOCUMENTS

JP 2011-147308 A 7/2011
JP 2012-192782 A 10/2012

(Continued)

*Primary Examiner* — Jonathan L Sample
(74) *Attorney, Agent, or Firm* — SoraIP, Inc.

(57) ABSTRACT

An electrified vehicle includes a first battery, a driving unit, and an auxiliary battery configured to be capable of supplying power to the driving unit. The first battery mounted on electrified vehicle can be replaced with a second battery by a battery replacement station provided outside electrified vehicle. Electrified vehicle supplies electric power from the auxiliary battery to the driving unit, thereby enabling the driving unit to be driven.

6 Claims, 9 Drawing Sheets

(56) References Cited

U.S. PATENT DOCUMENTS

| | | | | |
|---|---|---|---|---|
| 2020/0298710 | A1* | 9/2020 | Masaki | H02M 3/155 |
| 2021/0000351 | A1* | 1/2021 | Murali | A61B 5/02055 |
| 2021/0188116 | A1* | 6/2021 | Kikuchi | B60L 50/64 |
| 2021/0399566 | A1* | 12/2021 | Visvesha | B60L 53/65 |
| 2021/0402885 | A1* | 12/2021 | Boyd | B60L 53/30 |
| 2022/0012675 | A1* | 1/2022 | Nozawa | G06Q 10/08 |
| 2022/0274496 | A1* | 9/2022 | Gannamaneni | B60L 53/24 |
| 2023/0150385 | A1* | 5/2023 | Chung | B60L 58/12<br>429/62 |
| 2023/0402858 | A1* | 12/2023 | Takeuchi | B60R 16/033 |
| 2024/0116392 | A1* | 4/2024 | Saito | B60L 53/80 |
| 2024/0116393 | A1* | 4/2024 | Saito | B60L 53/67 |
| 2024/0185747 | A1* | 6/2024 | Murata | B60L 53/80 |
| 2024/0208525 | A1* | 6/2024 | Murata | B60L 53/80 |
| 2025/0109572 | A1* | 4/2025 | Barngrover | B60L 3/0092 |

FOREIGN PATENT DOCUMENTS

| | | |
|---|---|---|
| JP | 2020-156270 A | 9/2020 |
| JP | 2023-101504 A | 7/2023 |

* cited by examiner

FIG. 2

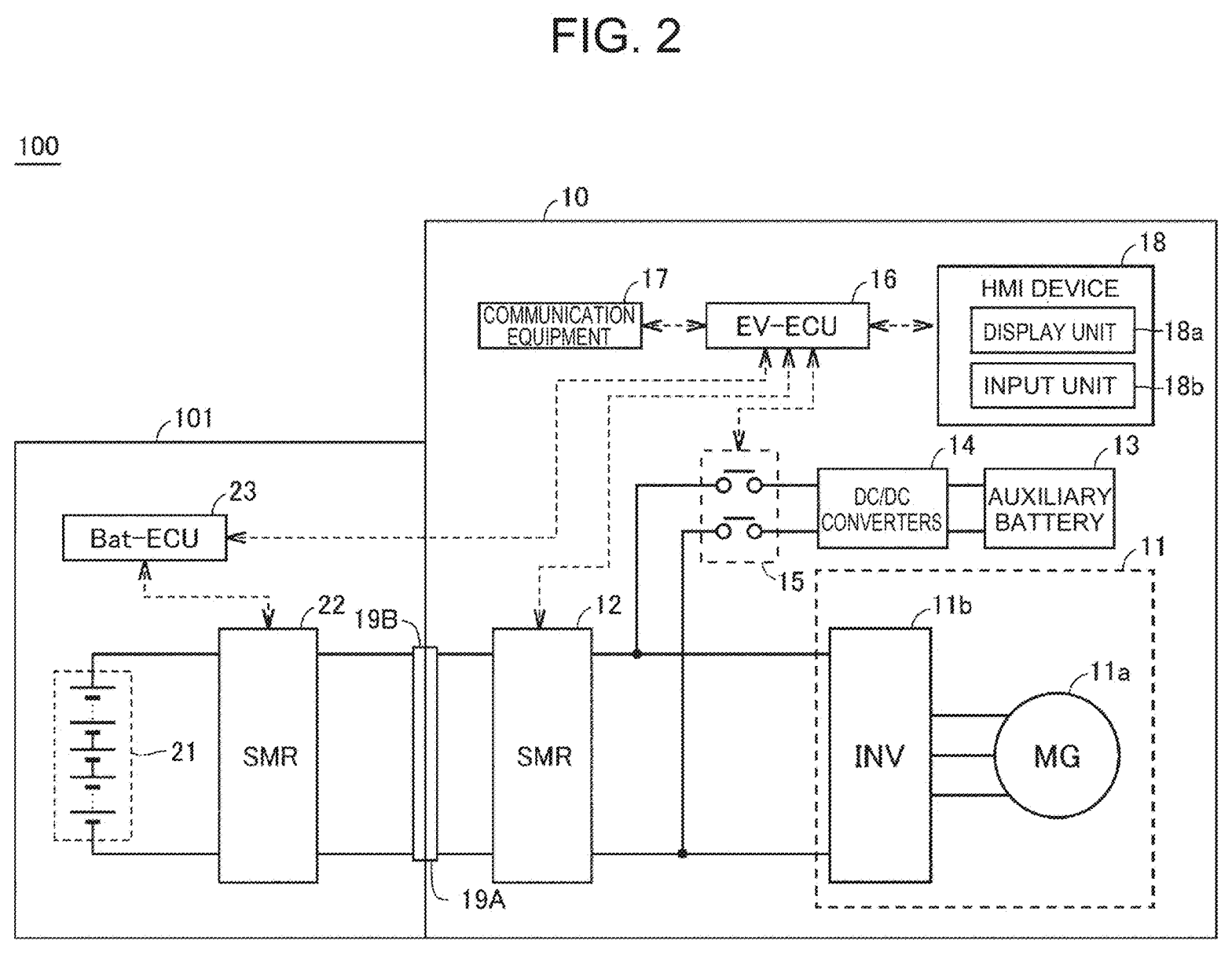

100
10
18
HMI DEVICE
18a
DISPLAY UNIT
18b
INPUT UNIT
13
AUXILIARY BATTERY
14
DC/DC CONVERTERS
11
11a
MG
11b
INV
16
EV-ECU
15
17
COMMUNICATION EQUIPMENT
12
SMR
19A
19B
101
22
SMR
23
Bat-ECU
21

FIG. 3

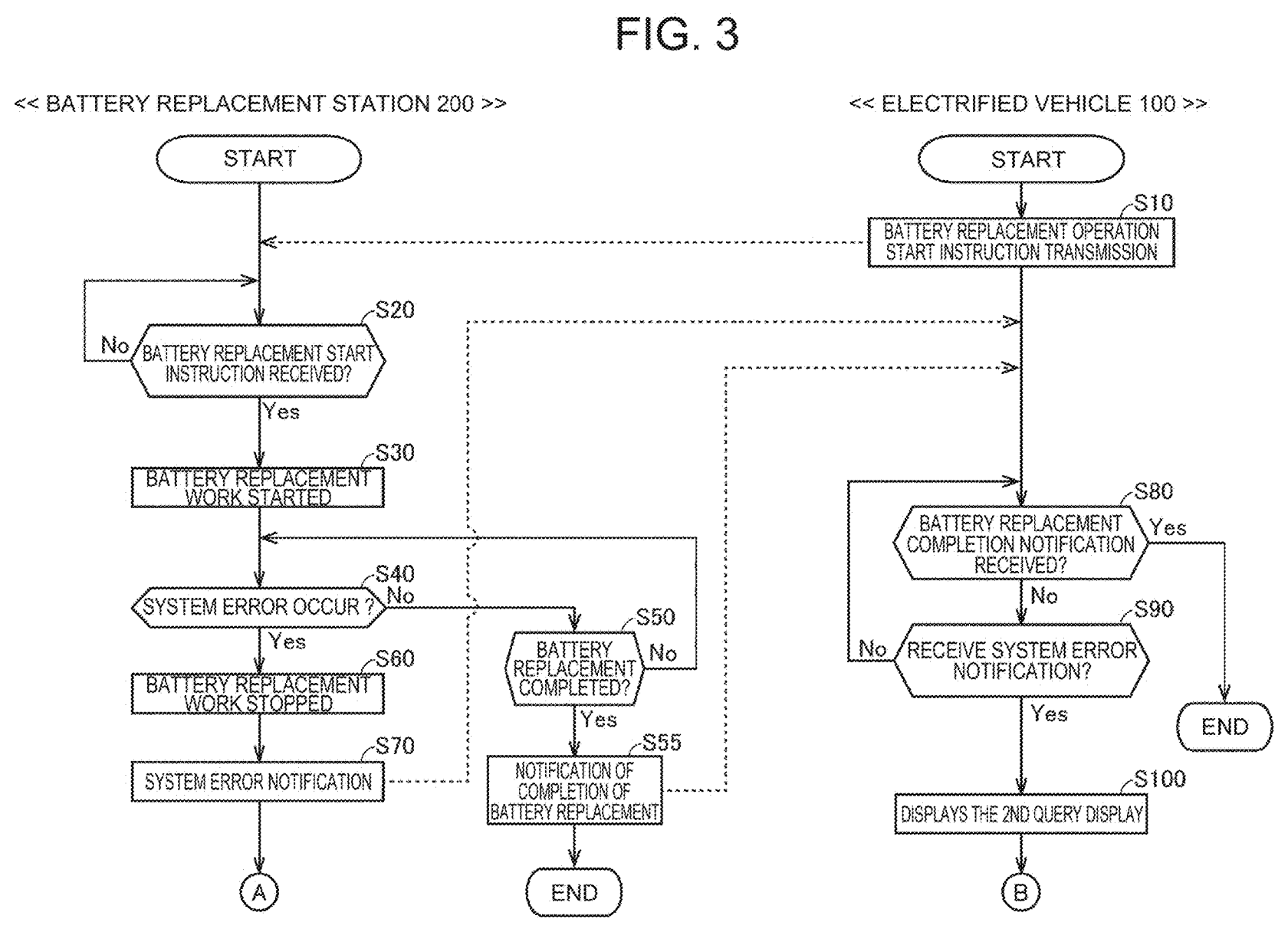

<< ELECTRIFIED VEHICLE 100 >>

START

S10 BATTERY REPLACEMENT OPERATION START INSTRUCTION TRANSMISSION

S80 BATTERY REPLACEMENT COMPLETION NOTIFICATION RECEIVED?

Yes

END

No

S90 RECEIVE SYSTEM ERROR NOTIFICATION?

No

Yes

S100 DISPLAYS THE 2ND QUERY DISPLAY

B

<< BATTERY REPLACEMENT STATION 200 >>

START

S20 BATTERY REPLACEMENT START INSTRUCTION RECEIVED?

No

Yes

S30 BATTERY REPLACEMENT WORK STARTED

S40 SYSTEM ERROR OCCUR ?

No

S50 BATTERY REPLACEMENT COMPLETED?

No

Yes

S55 NOTIFICATION OF COMPLETION OF BATTERY REPLACEMENT

END

Yes

S60 BATTERY REPLACEMENT WORK STOPPED

S70 SYSTEM ERROR NOTIFICATION

A

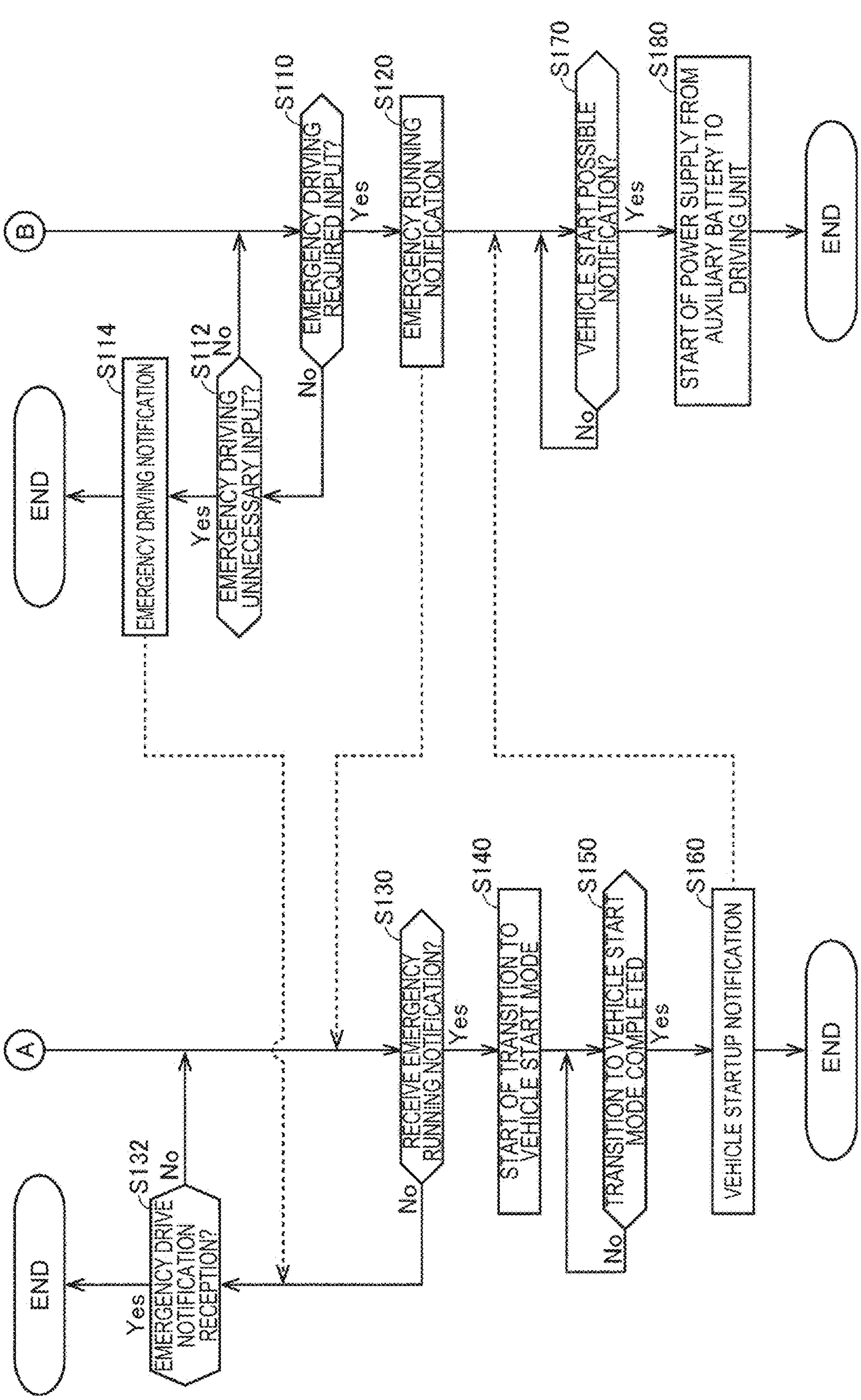
FIG. 4
B
S110
EMERGENCY DRIVING REQUIRED INPUT?
Yes
No
S112
EMERGENCY DRIVING UNNECESSARY INPUT?
Yes
No
S114
EMERGENCY DRIVING NOTIFICATION
END
S120
EMERGENCY RUNNING NOTIFICATION
S170
VEHICLE START POSSIBLE NOTIFICATION?
Yes
No
S180
START OF POWER SUPPLY FROM AUXILIARY BATTERY TO DRIVING UNIT
END
A
S130
RECEIVE EMERGENCY RUNNING NOTIFICATION?
Yes
No
S132
EMERGENCY DRIVE NOTIFICATION RECEPTION?
Yes
No
END
S140
START OF TRANSITION TO VEHICLE START MODE
S150
TRANSITION TO VEHICLE START MODE COMPLETED
Yes
No
S160
VEHICLE STARTUP NOTIFICATION
END THE BATTERY CHANGER HAS STOPPED
THE REPLACEMENT OPERATION URGENTLY.
DO YOU WANT TO RUN EV URGENTLY?

AN ERROR WAS FOUND IN THE NEW BATTERY
THAT WAS REPLACED.
DO YOU WANT TO RUN EV URGENTLY?

FIG. 9

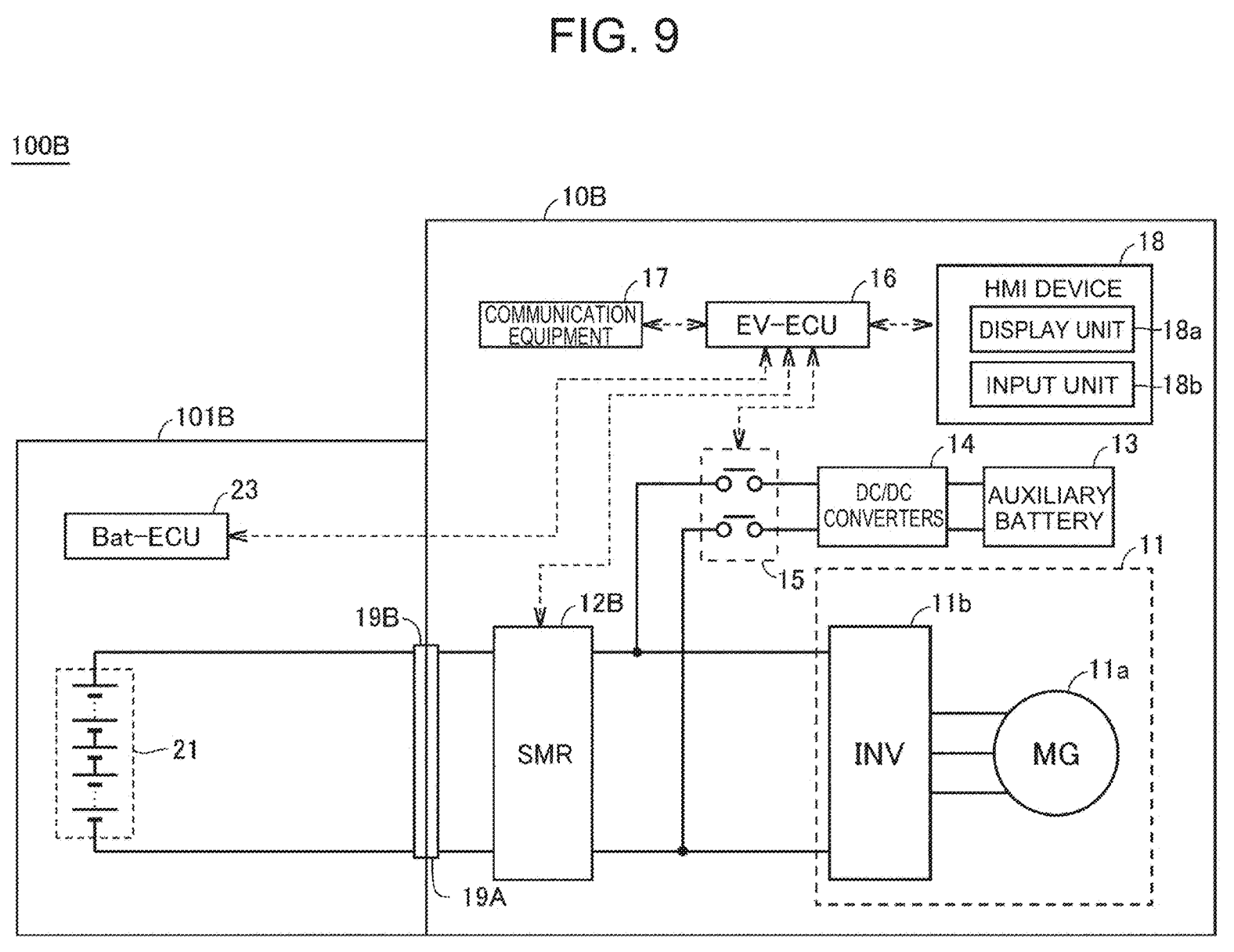

100B
10B
101B
18 HMI DEVICE
18a DISPLAY UNIT
18b INPUT UNIT
13 AUXILIARY BATTERY
14 DC/DC CONVERTERS
11
11a MG
11b INV
16 EV-ECU
17 COMMUNICATION EQUIPMENT
15
12B SMR
19A
19B
23 Bat-ECU
21

ELECTRIFIED VEHICLE

CROSS-REFERENCE TO RELATED APPLICATION

This application claims priority to Japanese Patent Application No. 2023-205462 filed on Dec. 5, 2023, incorporated herein by reference in its entirety.

BACKGROUND

1. Technical Field

The present disclosure relates to an electrified vehicle.

2. Description of Related Art

For example, Japanese Unexamined Patent Application Publication No. 2012-192782 (JP 2012-192782 A) discloses a battery replacement system that replaces a battery mounted in an electrified vehicle by lifting up the electrified vehicle with an elevating device.

SUMMARY

A situation in which an electrified vehicle needs to be evacuated from a battery replacement station due to an external factor such as a disaster may occur during a battery replacement operation performed by the battery replacement system disclosed in JP 2012-192782 A. However, if the battery replacement has not been completed, the electrified vehicle cannot be self-propelled and cannot be evacuated from the battery replacement station.

The present disclosure has been made to solve the above problem. An object of the present disclosure is to provide an electrified vehicle capable of self-propelling even if no power is supplied from a battery to a vehicle driving unit 11 of the electrified vehicle.

An electrified vehicle according to the present disclosure includes:

- a first battery;
- a driving unit; and
- an auxiliary battery that is configured to be able to supply power to the driving unit.

The first battery mounted in the electrified vehicle is replaceable with a second battery by a battery replacement station provided outside the electrified vehicle.

The electrified vehicle is able to drive the driving unit by supplying power from the auxiliary battery to the driving unit.

According to the above configuration, the electrified vehicle can drive the driving unit by the auxiliary battery. This allows the electrified vehicle to self-propel even if no power is supplied from the first battery or the second battery to the driving unit.

The above electrified vehicle further includes:

- a control unit;
- an input device that is operated by a user; and
- a switching device that switches electrical connection between the first battery or the second battery and the driving unit.
- when the control unit determines that an input indicating a start of moving is input by the user to the input device during a period from a start of replacement to an end of the replacement of the first battery by the battery replacement station, the control unit causes the switching device to disconnect the electrical connection and causes power from the auxiliary battery to be supplied to the driving unit.

With such a configuration, it is possible to start the power supply from the auxiliary battery to the driving unit using, as a trigger, the input indicating the start of moving from the user.

In the above electrified vehicle, the input device includes a display unit and an input unit that is operated by the user.

When the control unit determines that there is abnormality in the second battery after the battery replacement station performs replacement to the second battery, the control unit displays, on the display unit, first inquiry indication for inquiring to the user about whether to start moving.

With such a configuration, it is possible to ask the user about his/her determination regarding whether to start power supply from the auxiliary battery when an abnormality occurs in the battery after the replacement.

In the above electrified vehicle, the input device includes a display unit and an input unit that is operated by the user.

When the control unit receives a system abnormality signal from the battery replacement station, the control unit displays, on the display unit, second inquiry indication for inquiring to the user about whether to start moving.

With such a configuration, it is possible to ask the user about his/her determination regarding whether to start power supply from the auxiliary battery when there is a system abnormality from the battery replacement station.

In the above electrified vehicle, when the control unit determines that an input indicating a start of moving is input by the user to the input device, the control unit transmits a start signal to the battery replacement station.

When the battery replacement station receives the start signal, the battery replacement station brings the electrified vehicle into a state where the electrified vehicle is able to start moving and then transmits a start enable signal to the electrified vehicle.

When the control unit receives the start enable signal, the control unit causes power from the auxiliary battery to be supplied to the driving unit.

With such a configuration, the battery replacement station can release constraint of the electrified vehicle and cause the electrified vehicle to start moving using, as a trigger, a signal from the electrified vehicle even in a case where the electrified vehicle is constrained at the battery replacement station.

According to the present disclosure, it is possible to provide an electrified vehicle capable of self-propelling even if no power is supplied from a battery to a vehicle driving unit of the electrified vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating a configuration of an electrified vehicle according to an embodiment;

FIG. 3 is a diagram illustrating an electrified vehicle and an auxiliary battery startup process performed by a battery replacement station according to an embodiment;

FIG. 4 is a diagram illustrating an electrified vehicle and an auxiliary battery startup flow performed by a battery replacement station according to an embodiment;

FIG. 9 is a diagram illustrating a configuration of an electrified vehicle according to a second embodiment.

DETAILED DESCRIPTION OF EMBODIMENTS

Figure 1:
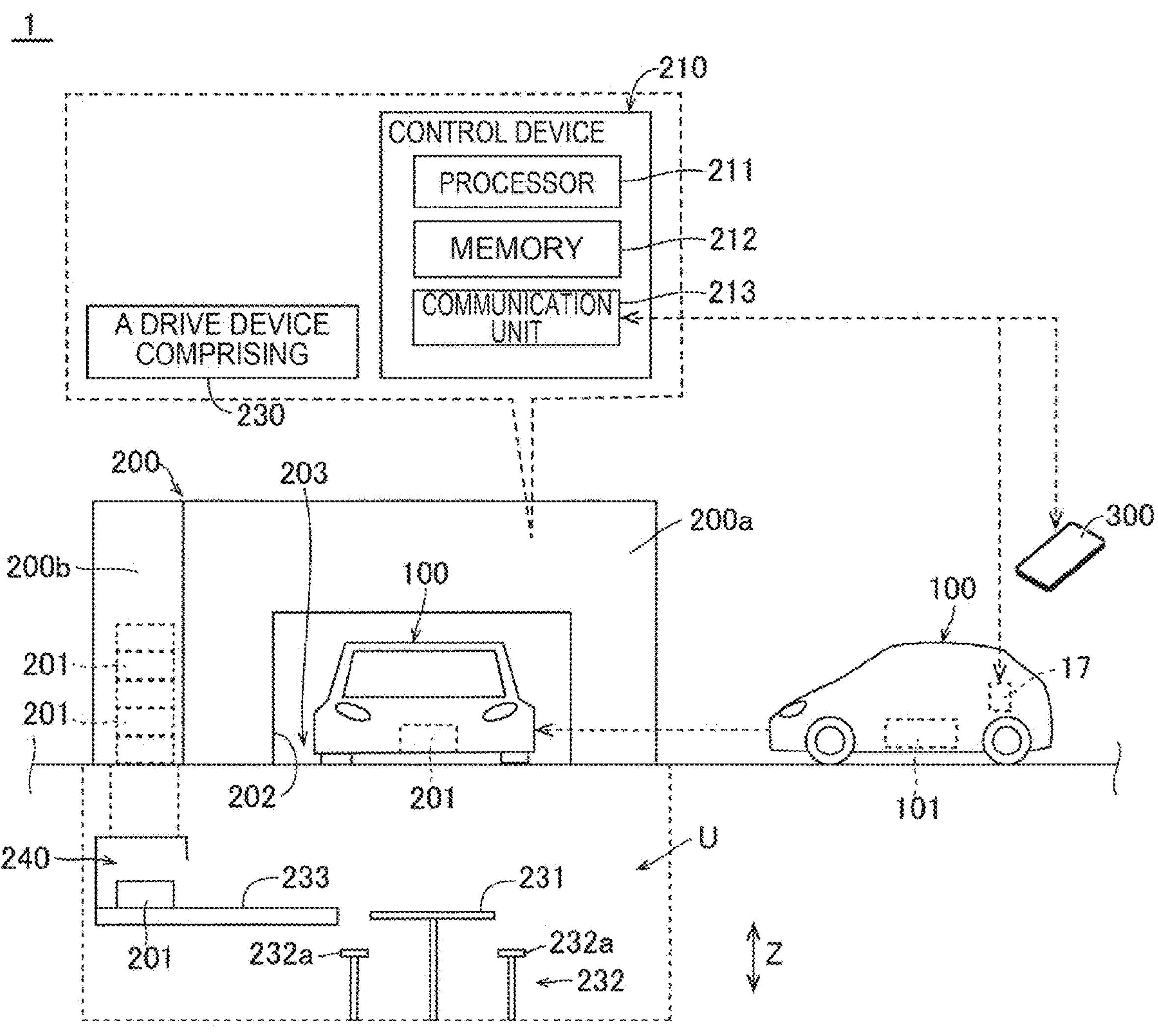
FIG. 1 is a diagram illustrating a configuration of a battery-replacing system including an electrified vehicle according to an embodiment.

Hereinafter, an embodiment of the present disclosure will be described in detail with reference to the drawings. The same or corresponding parts in the drawings will be denoted by the same reference signs to avoid repeating the same description.

Configuration of Battery Replacement System

FIG. 1 is a diagram illustrating a battery-exchange system including an electrified vehicle according to the present embodiment. Note that the Z direction described in the drawings indicates a moving direction of the battery placing table 231 described later.

Referring to FIG. 1, the battery replacement system 1 includes an electrified vehicle 100 and a battery replacement station 200.

Electrified vehicle 100 includes a communication device 17 and a battery 101. The communication device 17 is configured to be able to communicate with the battery replacement station 200. Electrified vehicle 100 is, for example, a battery electric vehicle (BEV) without an internal combustion engine. Note that the battery 101 is an example of a "first battery" of the present disclosure.

The battery replacement station 200 includes a battery replacement station main body 200*a* in which battery replacement is performed, and a storage 200*b* in which at least one battery 201 is stored. The battery replacement station main body 200*a* is a device that performs battery replacement for replacing the battery 101 mounted on electrified vehicle 100 with the battery 201. The storage 200*b* is provided in the battery replacement station main body 200*a*. The battery replacement station 200 (battery replacement station main body 200*a*) is provided with an entrance 202 for electrified vehicle 100 to and from. Note that the battery 201 is an example of a "second battery" of the present disclosure.

The battery 201 stored in the storage 200*b* is moved to the temporary placing place 240 provided in the underfloor area U, and then transported to electrified vehicle 100. A driving device 230 is provided in the underfloor area U.

The battery replacement station 200 (battery replacement station main body 200*a*) includes a control device 210 and a driving device 230. The driving device 230 includes a battery placing table 231, an elevating unit 232, and a conveyance unit 233. The driving device 230 further includes various sensors (not shown) for detecting that an operation failure has occurred.

The control device 210 includes a processor 211, a memory 212, and a communication unit 213. The memory 212 stores a program to be executed by the processor 211 and information (for example, a map, a mathematical expression, and various parameters) used in the program. The memory 212 further stores battery information that is information about the battery shape, the battery arrangement direction, the voltage, the output power, and the capacity (remaining capacity) of each battery 201. Note that the information regarding the battery arrangement orientation of the batteries 201 includes the position information of the connectors for connecting the batteries 201 to electrified vehicle 100. The processor 211 controls the driving device 230. The processor 211 notifies electrified vehicle 100 of the system abnormality via the communication unit 213 when a signal related to the system abnormality detected by the driving device 230 or the like is received.

The communication unit 213 includes various communication I/F. The processor 211 controls the communication unit 213. The communication unit 213 communicates with electrified vehicle 100 communication device 17. The communication unit 213 and electrified vehicle 100 (communication device 17) are capable of two-way communication. The communication unit 213 can also communicate with the mobile terminal 300 owned by the user of electrified vehicle 100. In the present embodiment, various types of data are exchanged between the communication device 17 of electrified vehicle 100 and the communication unit 213 of the battery replacement station 200.

The battery replacement station 200 is provided with a vehicle stop area 203. When an operation for instructing the start of the battery replacement operation is performed by the user in electrified vehicle 100 of HMI device 18 while electrified vehicle 100 is stopped in the vehicle stop area 203, the communication unit 213 receives an instruction signal for starting the battery replacement operation from electrified vehicle 100. HMI device 18 is shown in FIG. 2, which will be described later. The processor 211 starts the control of the battery replacement operation by the driving device 230 based on the reception of the instruction signal by the communication unit 213.

The elevating unit 232 raises and lowers electrified vehicle 100 while holding electrified vehicle 100 from below. The elevating unit 232 includes a pair of elevating bars 232*a*. Electrified vehicle 100 is supported from below by a pair of elevating bars 232*a*. Battery replacement (attachment and detachment of batteries) is performed while electrified vehicle 100 is held horizontally by a pair of elevating bars 232*a*.

The battery placing table 231 is configured to be movable up and down in the Z direction. When the battery placing table 231 is raised to the height position of the bottom of electrified vehicle 100, the battery 101 removed from electrified vehicle 100 is placed on the battery placing table 231. Further, the battery placing table 231 on which the battery 201 is placed is raised to the height position of the bottom of electrified vehicle 100, whereby the battery 201 is attached to electrified vehicle 100.

The conveyance unit 233 is configured to be able to convey the battery 101,201. Specifically, the conveyance unit 233 conveys the battery 101 removed from electrified vehicle 100 and placed on the battery placing table 231 to the temporary placing place 240. Further, the conveyance unit 233 conveys the battery 201 conveyed from the storage 200*b* to the temporary placing place 240 to the battery placing table 231.

FIG. 2 is a diagram illustrating a configuration of an electrified vehicle according to an embodiment of the present disclosure. Referring to FIG. 2, electrified vehicle 100 will be described in detail.

Electrified vehicle 100 includes a vehicle body 10 and a battery 101.

The vehicle body 10 is a part of electrified vehicle 100 other than the battery 101. The vehicle body 10 includes a vehicle driving unit 11, an SMR 12, an auxiliary battery 13, a DC/DC converter 14, a relay 15, an EV-ECU 16, a communication device 17, an HMI device 18, and a terminal 19A. The terminal 19A is formed to be electrically connectable to the terminal 19B formed in the battery 101, and the vehicle body 10 is configured to be electrically connectable to the battery 101 via the terminal 19A, 19B. The vehicle driving unit 11 is an example of a "driving unit" of the present disclosure. SMR 12 is an exemplary "switching device" of the present disclosure. EV-ECU 16 is an exemplary "control unit" of the present disclosure. HMI device 18 is an exemplary "inputting device" of the present disclosure.

The vehicle driving unit 11 includes a Motor Generator (MG) 11*a* and an inverter 11*b*. The vehicle driving unit 11 is configured to drive electrified vehicle 100 by using the electric power outputted from the battery 101.

MG 11*a* functions as a driving motor. MG 11*a* is electrically connected to the battery 101 via an inverter 11*b*. MG 11*a* converts power from the battery 101 into torques to rotate the drive wheels of electrified vehicle 100. Further, MG 11*a* performs regenerative power generation, for example, at the time of deceleration of electrified vehicle 100, and charges the battery 101.

The inverter 11*b* functions as a Power Control Unit (PCU) for MG 11*a*. The inverter 11*b* drives MG 11*a* using the electric power supplied from the battery 101.

SMR 12 functions as an on-off switch of the electric circuitry between the inverter 11*b* and the battery 101 in accordance with an instruction from EV-ECU 16. SMR 12 is provided between the inverter 11*b* and the battery 101. Note that "SMR" means a system main relay.

The auxiliary battery 13 supplies electric power for driving the auxiliary devices mounted on electrified vehicle 100, for example, the communication device 17, EV-ECU 16, and HMI device 18. The auxiliary battery 13 is connected to a wire connecting the inverter 11*b* and SMR 12 via DC/DC converters 14.

DC/DC converter 14 boosts the DC current supplied from the auxiliary battery 13 to MG 11*a* and supplies the boosted DC current to the inverter 11*b*. DC/DC converters 14 are provided between wires connecting the auxiliary battery 13, SMR 12, and the inverter 11*b*.

The relay 15 functions as an on-off switch of the electric circuit between the auxiliary battery 13 and the inverter 11*b* in accordance with an instruction from EV-ECU 16. The relays 15 are provided between DC/DC converters 14 and the wires connecting SMR 12 and the inverter 11*b*.

EV-ECU 16 includes a processor (not shown) and memories. The processor controls the respective devices of electrified vehicle 100 based on information recorded in the memories and information acquired through a communication device 17 or the like which will be described later. EV-ECU 16 is connected to devices (SMR 12, relays 15, communication devices 17, HMI devices 18, and Bat-ECU 23) via an in-vehicle network (for example, a Controller Area Network (CAN)) so as to be able to communicate with each other. EV-ECU 16 communicates with the communication unit 213 using the communication device 17.

The communication device 17 is an interface for communicating with a device outside the vehicle (the communication unit 213, the mobile terminal 300, and the like) via a network. The communication device 17 transmits information transmitted from EV-ECU 16 to a device outside the vehicle, or transmits information received from a device outside the vehicle to EV-ECU 16.

HMI device 18 includes a display unit 18*a* and an input unit 18*b* provided in the vehicle cabin. HMI device 18 may include a touch panel display. The input unit 18*b* may be a hard key provided in the display unit 18*a* or may be operated on a touch panel display. HMI device 18 outputs a signal corresponding to an input to the input unit 18*b* by the user to EV-ECU 16.

The battery 101 includes a battery 21, an SMR 22, a Bat-ECU 23, and a terminal 19B.

The battery 21 is, for example, a secondary battery such as a lithium ion battery, a nickel metal hydride battery, or a sodium ion battery. The type of the secondary battery may be a liquid secondary battery or an all-solid secondary battery. The battery 21 is formed to be electrically connectable to the vehicle body 10 by connecting the terminal 19A and the terminal 19B.

SMR 22 functions as an on-off switch of an electric circuit between the battery 21 and the terminal 19B in accordance with an instruction from a Bat-ECU 23 described later. SMR 22 is provided between the battery 21 and the terminal 19B.

Bat-ECU 23 includes a processor (not shown) and memories. The processor controls SMR 22 based on information recorded in the memories and information acquired from EV-ECU 16. Bat-ECU 23 is communicably connected to EV-ECU 16 and SMR 22 via an in-vehicle network (e.g., a Controller Area Network (CAN)). Bat-ECU 23 switches on-off of SMR 22 based on the instruction of EV-ECU 16. Note that the configuration of the battery 201 is the same as the configuration of the battery 101.

Auxiliary Battery Startup Flow

Next, referring to FIGS. 3 and 4, electrified vehicle and the auxiliary battery starting flow executed by the battery replacement station will be described.

In S10 shown in FIG. 3, electrified vehicle 100 sends an instruction to the battery replacement station 200 to initiate a battery replacement operation. Specifically, in S10, electrified vehicle 100 is disposed in the vehicle stop area 203. After that, when the user enters HMI device 18, electrified vehicle 100 instructs the battery replacement station 200 to begin replacing the battery 101 mounted on electrified vehicle 100.

In S20, the battery replacement station 200 confirms whether a notification of a battery replacing operation starting instruction is received from electrified vehicle 100. If the notification of the battery replacement operation starting instruction has been received (Yes in S20), the process of the battery replacement station 200 proceeds to S30. The battery replacement station 200 processes S20 again if the notification of the battery replacement operation starting instruction has not been received (No in S20).

In S30, the battery replacement station 200 initiates a battery replacement operation. In the battery-replacing operation, electrified vehicle 100 is restrained by a ring fastening (not shown). Alternatively, electrified vehicle 100 is held and restrained from below by the elevating unit 232.

In S40, the battery replacement station 200 determines whether a system-failure for the battery-replacement operation has been detected. Specifically, various sensors provided in the driving device 230 or the like of the battery replacement station 200 detect an abnormality of the system, and transmit a signal of the system abnormality to the processor 211. The processor 211 determines whether or not a system abnormality has occurred in the battery replacement station 200 based on the presence or absence of a signal. If a system-failure has occurred (Yes in S40), the process of the battery replacement station 200 proceeds to S60. If no system-failure has occurred (No in S40), the process of the battery replacement station 200 proceeds to S50.

In S50, the battery replacement station 200 determines whether the battery replacement operation is complete. If the operation is completed (Yes in S50), the battery replacement station 200 sends a battery replacement operation completion notification to electrified vehicle 100 and completes the process (S55). If the operation is not complete (No in S50), the battery replacement station 200 processes S40 again.

In S60, the battery replacement station 200 stops the battery replacement operation.

In S70, the battery replacement station 200 notifies electrified vehicle 100 that a system-failure has occurred.

In S80, electrified vehicle 100 checks whether a battery replacement operation completion notification has been received from the battery replacement station 200. If a notification is received (Yes in S80), electrified vehicle 100 completes the process. If no notification has been received (No in S80), electrified vehicle 100 process proceeds to S90.

In S90, electrified vehicle 100 checks whether a notification indicating that a system-failure has occurred has been received from the battery replacement station 200. If a notification is received (Yes in S90), electrified vehicle 100 process proceeds to S100. If no notification has been received (No in S90), electrified vehicle 100 processes S80 again.

Figure 5:
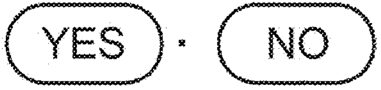
FIG. 5 is a diagram illustrating a second query display according to one embodiment.

In S100, electrified vehicle 100 displays a second query indication on HMI device 18. An example of the second query display is shown in FIG. 5. The second query indication is displayed on electrified vehicle 100's HMI device 18 and asks the user of electrified vehicle 100 to determine whether or not to perform urgent EV travel. The user selects and instructs the correspondence to be performed by electrified vehicle 100 from the options displayed on HMI device 18.

Referring to FIG. 4, in S110, electrified vehicle 100 confirms whether or not the user has entered that the emergency travel is to be performed with respect to the second query indication. When the user confirms the entry of the execution necessity (Yes in S110), electrified vehicle 100 notifies the battery replacement station 200 of the urgent start necessity (S120). Then, electrified vehicle 100 process proceeds to S170. If it is not possible to confirm the entry of the execution necessity (No in S110), electrified vehicle 100 process proceeds to S112.

In S112, electrified vehicle 100 checks whether or not the user has entered no urgent travel for the second inquiry indication. When the user confirms that the operation is unnecessary (Yes in S112), electrified vehicle 100 notifies the battery replacement station 200 that the emergency start is unnecessary (S114), and the process ends.

In S130, the battery replacement station 200 confirms whether a notification indicating the urgent start is received from electrified vehicle 100. If so (Yes in S130), the process of the battery replacement station 200 proceeds to S140. If not (No in S130), the process of the battery replacement station 200 proceeds to S132.

In S132, the battery replacement station 200 confirms whether a notification indicating that an emergency start is not necessary is received from electrified vehicle 100. If so (Yes in S132), the battery replacement station 200 ends the process. If not received (No in S130), the battery replacement station 200 processes S130 again.

In S140, the battery replacement station 200 transitions to a configuration in which vehicles can launch. This is because electrified vehicle 100 is restrained by the driving device 230 and therefore cannot start during the battery-replacing operation.

In S150, the battery replacement station 200 checks whether the transition to the form in which the vehicles can start has been completed. If the completion is confirmed (Yes in S150), the process of the battery replacement station 200 proceeds to S160. If the completion is not confirmed (No in S160), the battery replacement station 200 processes S150 again.

In S160, the battery replacement station 200 notifies electrified vehicle 100 that the vehicle can be started, and the battery replacement station 200 completes the process.

In S170, electrified vehicle 100 confirms whether or not a notification indicating that the vehicle can be started is received. If received (Yes in S170), electrified vehicle 100 process proceeds to S180. If not received (No in S170), electrified vehicle 100 processes S170 again.

In S180, electrified vehicle 100 starts supplying electric power from the auxiliary battery to the vehicle driving unit 11. Specifically, in an EV-ECU 16 where the completion of the transition of the battery replacement station 200 to the vehicle starting mode is confirmed via the communication device 17, it is confirmed that SMR 12 is OFF, and it is confirmed that the relays 15 are turned on. Electric power from the auxiliary battery 13 is boosted by DC/DC converter 14, converted into three-phase alternating current by the inverter 11*b*, and supplied to MG 11*a*.

As described above, in the present embodiment, when a system error occurs during the battery replacement operation by the battery replacement station 200, the battery replacement station 200 inquires of electrified vehicle 100 whether or not an urgent start is necessary. When the battery replacement station 200 receives a notification indicating that an emergency-start is required, the battery replacement station 200 releases electrified vehicle 100 restraint so that the vehicles can start. The battery replacement station 200 then notifies electrified vehicle 100 that it is available for transmission. Then, electrified vehicle 100 that has received the notification starts supplying electric power from the auxiliary battery to the vehicle driving unit 11.

In the above embodiment, an example has been described in which power is supplied from the auxiliary battery 13 when a system abnormality occurs during the battery replacement operation, but the present disclosure is not limited to this. For example, when electrified vehicle 100 determines that there is an abnormality in the battery 201 after the replacement operation of the battery 201 by the battery replacement station 200 is completed, the electric power may be supplied from the auxiliary battery 13 to the vehicle driving unit 11.

Figure 6:
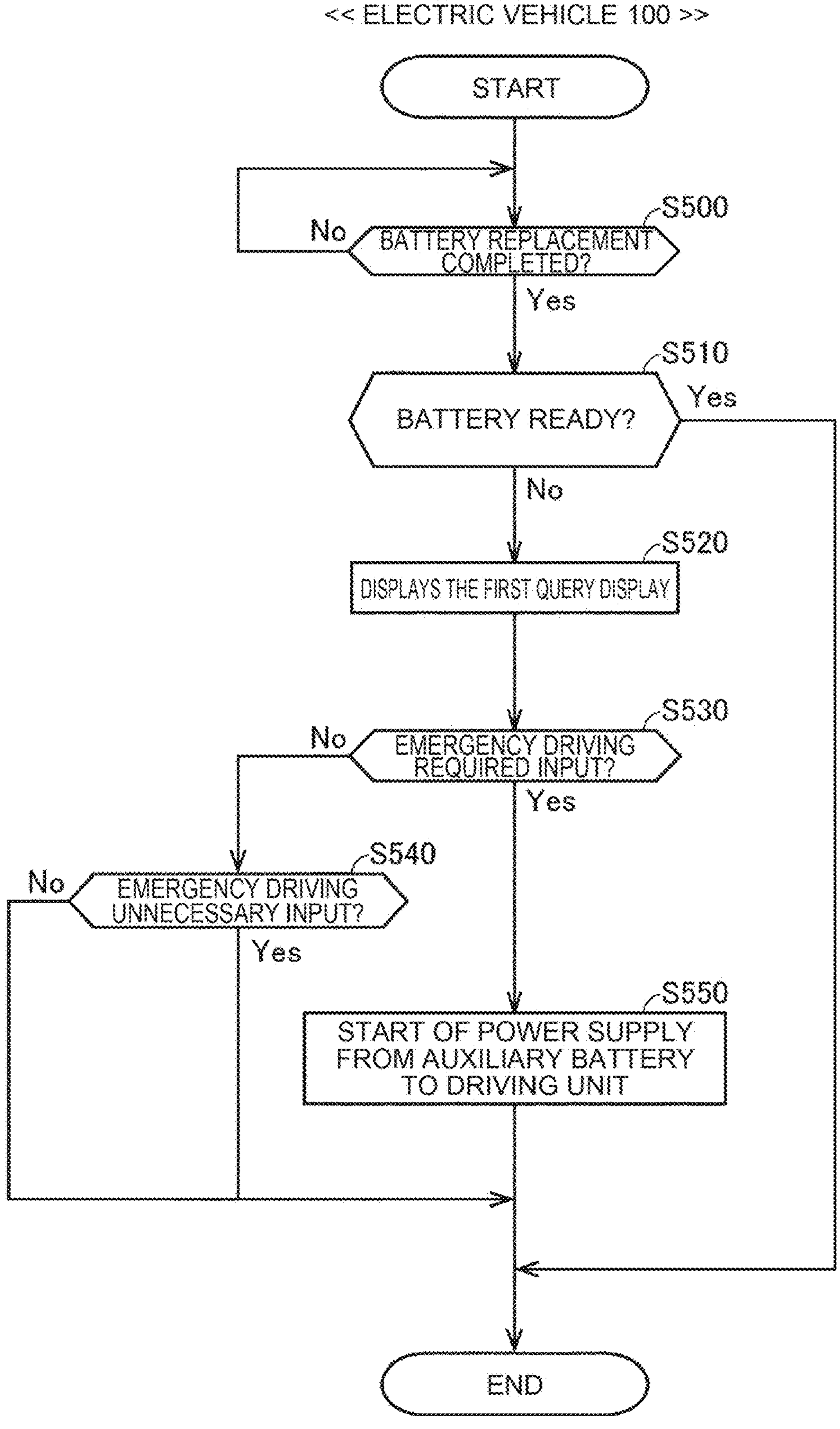
FIG. 6 is a diagram illustrating an auxiliary battery startup flow executed only by electrified vehicle according to the modification of the embodiment.

With reference to FIG. 6, a process from determination of abnormality of the battery 201 to power supply by the auxiliary battery will be described.

In S500, electrified vehicle 100 checks whether the replacement of the battery 201 has been completed. If the completion is confirmed (Yes in S500), electrified vehicle 100 process proceeds to S510. If the completion cannot be confirmed (No in S500), electrified vehicle 100 processes S500 again.

In S510, electrified vehicle 100 checks whether it can be driven by the battery 201. When the drivability cannot be confirmed, insufficient SOC of the battery 201, poor connection of the terminal 19A, 19B, poor operation of SMR 12 and SMR 22, poor communication between EV-ECU 16 and Bat-ECU 23, and the like are assumed. If drive is possible (Yes in S510), electrified vehicle 100 completes the process. If the driving cannot be performed (No in S510), electrified vehicle 100 process proceeds to S520.

Figure 7:
FIG. 7 is a diagram illustrating a first query display according to one embodiment.

In S520, electrified vehicle 100 causes HMI device 18 to display a first query indication. An example of the first query display is shown in FIG. 7. The first inquiry indication is displayed on electrified vehicle 100's HMI device 18, and asks the user of electrified vehicle 100 to determine whether or not to perform urgent EV travel. The user selects and instructs the correspondence to be performed by electrified vehicle 100 from the options displayed on HMI device 18.

In S530, electrified vehicle 100 confirms whether the user has entered an urgent travel requirement in response to the first query indication. If it is confirmed that the vehicle needs to be urgently traveled (Yes in S530), electrified vehicle 100 process proceeds to S550. If it is not possible to confirm that the urgent driving is required (No in S530), electrified vehicle 100 process proceeds to S540.

In S540, electrified vehicle 100 checks whether or not the user has entered an urgent driving unnecessary in response to the first inquiry indication. If the user confirms that no urgent travel is required (Yes in S540), electrified vehicle 100 completes the process. If it is not possible to confirm that no urgent driving is required (No in S540), electrified vehicle 100 processes S530 again.

In S550, electrified vehicle 100 starts supplying electric power from the auxiliary battery to the vehicle driving unit 11, and completes the process.

In the above embodiment, electrified vehicle 100 receives the system-abnormality notification from the battery replacement station 200 and confirms whether or not the battery 201 can be driven, and asks the user to determine whether or not to perform urgent EV travel. However, the present disclosure is not limited thereto. For example, electrified vehicle 100 may ask the user to decide whether or not to perform urgent EV traveling based on the fact that the user of the electrified vehicle 100 has turned on a hardware key provided in the vehicle.

In the above embodiment, the query indication is displayed on HMI device 18 of electrified vehicle 100, but the present disclosure is not limited thereto. For example, electrified vehicle 100 may display an inquiry indication on the mobile terminal 300.

Figure 8:
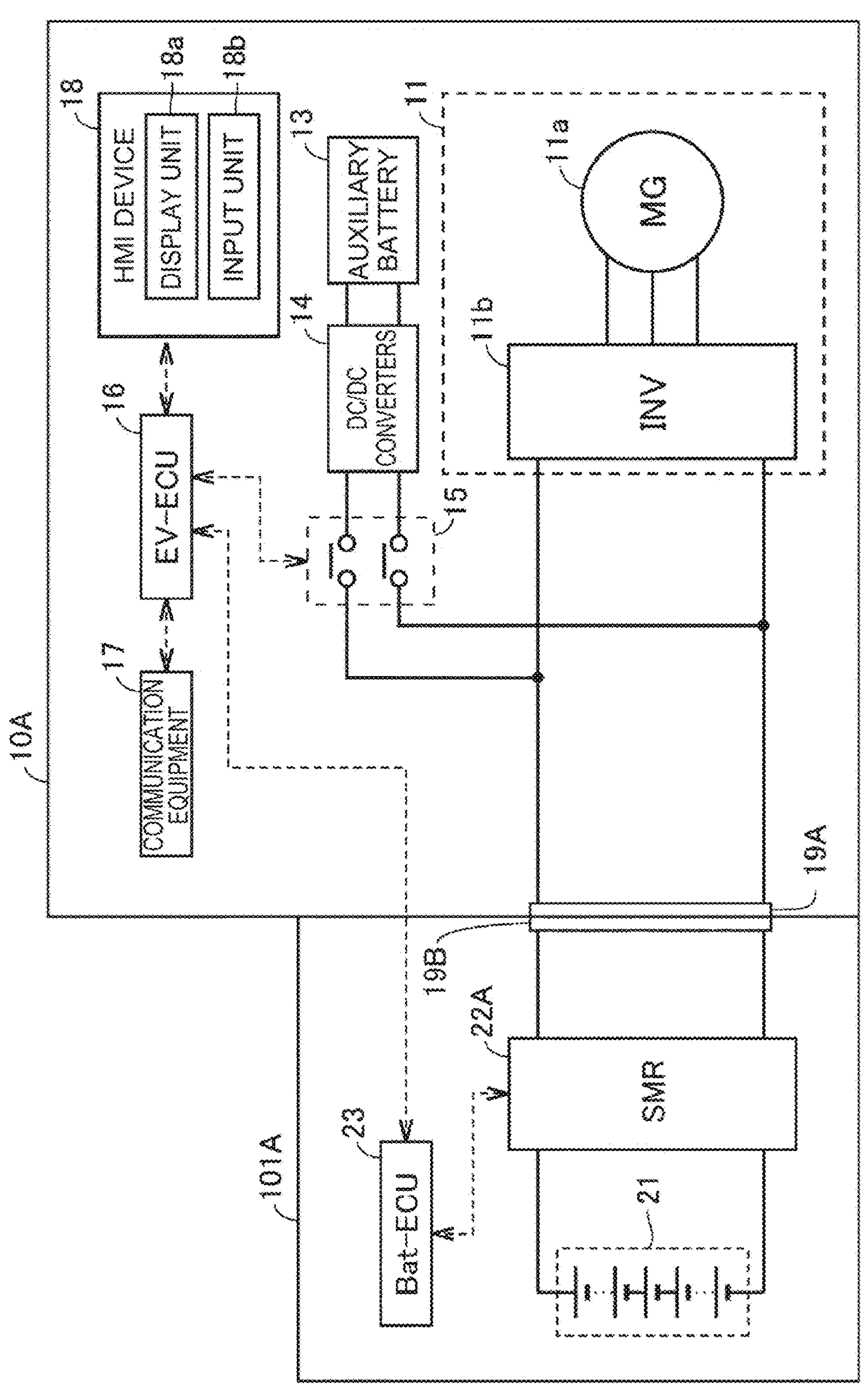
FIG. 8 is a diagram illustrating a configuration of an electrified vehicle according to another first embodiment.

In the above-described embodiment, the vehicle body 10 and the first battery 101 have their own SMR, but the present disclosure is not limited thereto. For example, as shown in FIG. 8, electrified vehicle 100A may include a vehicle body 10A and a battery 101A, and the vehicle body 10A may not include an SMR, and only the battery 101A may include an SMR 22A. Similarly, as shown in FIG. 9, electrified vehicle 100B may include a vehicle body 10B and a battery 101B, only the vehicle body 10B may have an SMR 12B, and the battery 101B may not have an SMR. Note that other configurations and controls are the same as those of the above-described embodiments of the present disclosure, and therefore, repetitive description will not be given.

It should be considered that the embodiments disclosed above are for illustrative purposes only and are not limitative of the disclosure in any aspect. The scope of the present disclosure is defined by the terms of the claims, and is intended to include any modifications within the scope and meaning equivalent to the terms of the claims.

What is claimed is:

1. An electrified vehicle comprising:

a first battery mounted in the electrified vehicle, the first battery being replaceable with a second battery at a battery replacement station provided outside the electrified vehicle;

a driving unit including a motor and an inverter, the driving unit being configured to drive the electrified vehicle by using electric power supplied from the first battery or the second battery;

an auxiliary battery configured to supply electric power to an auxiliary device mounted in the electrified vehicle;

a converter configured to boost a current supplied from the auxiliary battery to the driving unit;

a switching device configured to switch electrical connection between the first battery or the second battery and the driving unit;

a relay provided between the converter and a wire connecting the switching device and the driving unit; and a processor configured to, in a case where a predetermined condition is satisfied, cause the switching device to disconnect the electrical connection and cause the relay to connect the converter and the wire such that the current boosted by the converter is supplied to the driving unit.

2. The electrified vehicle according to claim 1, further comprising:

an input device that is operated by a user, wherein the predetermined condition is that the processor determines that an input indicating a start of moving of the electrified vehicle is input by the user to the input device during a period from a start of replacement of the first battery to an end of the replacement at the battery replacement station.

3. The electrified vehicle according to claim 2, wherein:

the input device includes a display and a user input interface that is operated by the user; and in a case where the processor determines that there is abnormality in the second battery after the battery replacement station performs the replacement, the processor is configured to cause the display to display first inquiry indication for inquiring to the user about whether to start moving.

4. The electrified vehicle according to claim 2, wherein:

the input device includes a display and a user input interface that is operated by the user; and in a case where the processor receives a system abnormality signal from the battery replacement station, the processor is configured to cause the display to display second inquiry indication for inquiring to the user about whether to start moving.

5. The electrified vehicle according to claim 1, wherein the auxiliary device includes a human machine interface device.

6. The electrified vehicle according to claim 1, wherein the wire is configured to connect the switching device and the inverter.

* * * * *